(12) United States Patent
Bliven

(10) Patent No.: US 7,474,522 B2
(45) Date of Patent: Jan. 6, 2009

(54) HEIGHT ADJUSTMENT MECHANISM FOR ELECTRONIC EQUIPMENT

(75) Inventor: Robert Bliven, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 11/146,669

(22) Filed: Jun. 6, 2005

(65) Prior Publication Data

US 2006/0289706 A1 Dec. 28, 2006

(51) Int. Cl.
*G06F 1/16* (2006.01)
*H05K 5/00* (2006.01)
*H05K 7/00* (2006.01)

(52) U.S. Cl. .................. 361/681; 361/682; 361/683; 248/917; 248/919; 248/920; 248/162.1; 248/161; 248/157; 248/176.1

(58) Field of Classification Search .............. 248/917, 248/919, 920, 162.1, 161, 157, 176.1; 361/681, 361/682, 683

See application file for complete search history.

(56) References Cited

U.S. PATENT DOCUMENTS

| | | | | | |
|---|---|---|---|---|---|
| 4,616,218 | A | * | 10/1986 | Bailey et al. | ............... 361/682 |
| 4,953,256 | A | | 9/1990 | Salmela et al. | |
| 5,262,762 | A | * | 11/1993 | Westover et al. | ............ 345/168 |
| 6,132,001 | A | * | 10/2000 | Su | ......................... 297/411.36 |
| 6,381,125 | B1 | * | 4/2002 | Mizoguchi et al. | .......... 361/682 |
| 6,712,321 | B1 | * | 3/2004 | Su et al. | ................ 248/123.11 |
| 6,874,743 | B2 | * | 4/2005 | Watanabe et al. | ........ 248/276.1 |
| 6,918,564 | B2 | * | 7/2005 | Yen et al. | ..................... 248/404 |
| 6,938,869 | B2 | * | 9/2005 | Lin et al. | ..................... 248/414 |
| 6,994,303 | B2 | * | 2/2006 | Lin et al. | ................. 248/122.1 |
| 7,036,787 | B1 | * | 5/2006 | Lin | ............. 248/676 |
| 7,124,984 | B2 | * | 10/2006 | Yokouchi et al. | ......... 248/125.8 |
| 7,198,240 | B2 | * | 4/2007 | Chen | ........................ 248/284.1 |
| 7,201,353 | B1 | * | 4/2007 | Freeman | ..................... 248/161 |
| 2003/0075649 | A1 | * | 4/2003 | Jeong et al. | ................. 248/157 |
| 2003/0121124 | A1 | * | 7/2003 | Chen | .......................... 16/339 |
| 2003/0173475 | A1 | * | 9/2003 | Hsieh | ......................... 248/161 |
| 2004/0056161 | A1 | * | 3/2004 | Ishizaki et al. | ........... 248/176.3 |
| 2004/0118984 | A1 | * | 6/2004 | Kim et al. | .................... 248/149 |
| 2005/0184215 | A1 | * | 8/2005 | Lin | ............................. 248/676 |
| 2005/0194499 | A1 | * | 9/2005 | Drew et al. | .............. 248/125.1 |
| 2006/0102812 | A1 | * | 5/2006 | Cvek | ....................... 248/125.2 |
| 2006/0145036 | A1 | * | 7/2006 | Jones et al. | ............. 248/188.5 |
| 2006/0171105 | A1 | * | 8/2006 | Hsiao | ......................... 361/681 |
| 2006/0175476 | A1 | * | 8/2006 | Hasegawa et al. | ........ 248/125.1 |
| 2006/0175512 | A1 | * | 8/2006 | She | ......................... 248/354.1 |
| 2006/0219849 | A1 | * | 10/2006 | Chiu | ....................... 248/125.8 |
| 2007/0034756 | A1 | * | 2/2007 | Tsai et al. | .................... 248/161 |
| 2007/0097608 | A1 | * | 5/2007 | Matsutani et al. | ........... 361/681 |
| 2007/0102600 | A1 | * | 5/2007 | Ishizaki et al. | ........... 248/176.3 |

* cited by examiner

*Primary Examiner*—Anita M King
*Assistant Examiner*—Nkeisha J Dumas

(57) ABSTRACT

A height adjustment mechanism for electronic equipment is disclosed. The height adjustment mechanism includes a first sliding component that includes a first set of mechanical structures for engaging a second set of mechanical structures, a first mechanical sub-component coupled to the first sliding component and coupled to a second mechanical sub-component that includes the second set of mechanical structures and a second sliding component coupled to the first sliding component. The first set of mechanical structures and the second set of mechanical structures are configured to mesh. A movement of the first sliding component causes either an expansion or a retraction of the first mechanical sub-component.

26 Claims, 2 Drawing Sheets

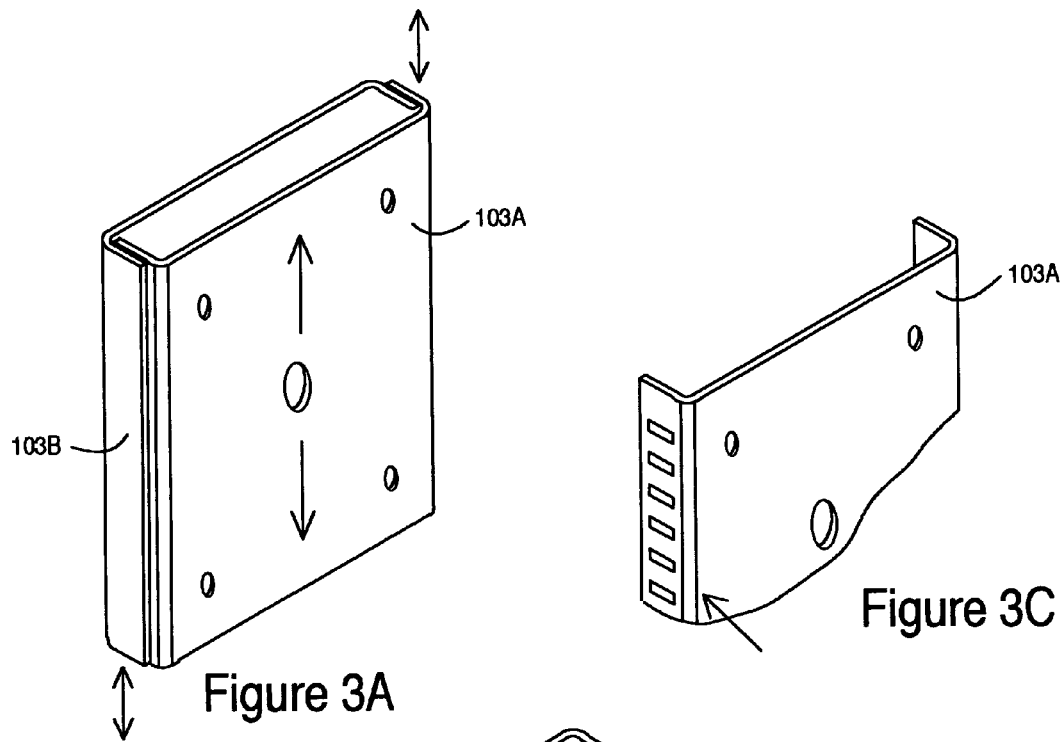
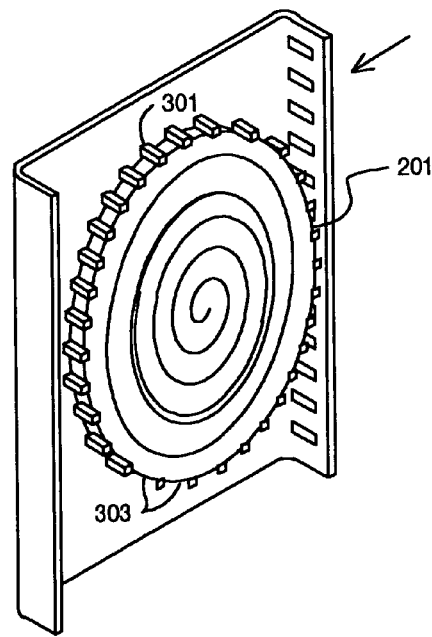
Figure 3A
Figure 3C
Figure 3B

HEIGHT ADJUSTMENT MECHANISM FOR ELECTRONIC EQUIPMENT

TECHNICAL FIELD

Embodiments of the present invention pertain to height adjustment mechanisms for electronic equipment.

BACKGROUND ART

Consumer demand for smaller, lighter and more compact products that can be easily managed fuels the desire of manufacturers to deliver such products to market. Responding to the demand of consumers, manufacturers produce products such as desktop, laptop and hand-held computing devices that use components that require a minimal amount of space. As a result, consumer products that are increasingly convenient to manage in terms of their weight and the amount of space that they occupy continually arrive on the market. However, there exists a continued need for innovation in this area.

Vertical height adjustment is a basic feature of many electronic device assemblies, e.g., desktop computers, other devices that use flat panel displays etc. Moreover, flat panel display assemblies that feature vertical height adjustment provide consumers with a capacity to adjust the vertical height of a display to suit an individual consumers needs. However, many of the conventional approaches to vertical height adjustment include parts that are heavy and that consume a significant amount of space.

Several approaches to height adjustment have been employed in the past. In one approach, an assembly that includes a heavy column that uses a constant force spring and racks with gears is employed. The assembly is very heavy which adds cost for shipping and work for setup.

In another approach, an assembly that includes a double pivoted arm is employed. The assembly includes plates and springs and pivot washers at the upper and lower pivots of the double pivoted arm. Because of the friction washers that are used to keep the double pivoted arm in position, users have to overcome the friction that is provided by the friction washers during adjustment of the double pivoted arm. To overcome this problem, either more force is required from the user to adjust the double pivoted arm, or additional springs are needed in the pivot shafts to assist the users' adjustment of the double pivoted arm. In addition, the assembly of the double pivoted arm must be made sufficiently stiff to provide stability (e.g., resist wobbling), which adds parts, weight, size, and cost.

DISCLOSURE OF THE INVENTION

A height adjustment mechanism for electronic equipment is disclosed. The height adjustment mechanism includes a first sliding component that includes a first set of mechanical structures for engaging a second set of mechanical structures, a first mechanical sub-component coupled to the first sliding component and coupled to a second mechanical sub-component that includes the second set of mechanical structures and a second sliding component coupled to the first sliding component. The first set of mechanical structures and the second set of mechanical structures are configured to mesh. A movement of the first sliding component causes either an expansion or a retraction of the first mechanical sub-component.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 illustrates basic components of the height adjustment mechanism according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
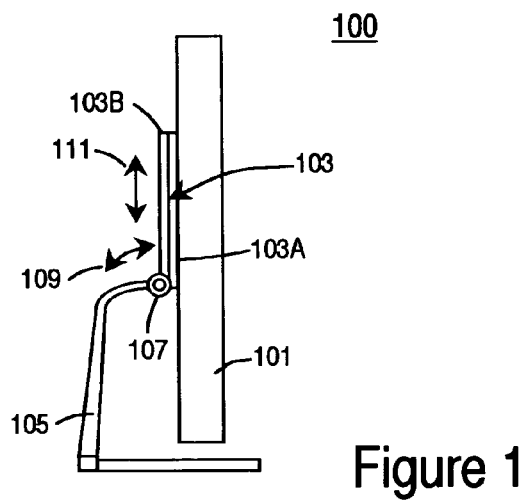
FIG. 1 shows a flat panel computer system assembly that includes a height adjustment mechanism according to one embodiment of the present invention.

FIG. 1 shows a flat panel computer system assembly 100 that includes a height adjustment mechanism 103 according to one embodiment of the present invention. In one embodiment, the height adjustment mechanism 103 facilitates the vertical height adjustment of a flat panel display 101. In the FIG. 1 embodiment, computer system assembly 100 includes flat panel display 101, height adjustment mechanism 103 (including a first nested slide plate 103A and a second nested slide plate 103B), assembly mount component 105, and tilt adjustment mechanism 107. In the FIG. 1 embodiment, the structure of the flat panel computer system assembly 100 facilitates both a pivot 109 motion and a vertical 111 motion positioning of the flat panel display 101.

In one embodiment, the height adjustment mechanism 103 can be coupled to the flat panel display 101 and the assembly mount component 105 as is shown in FIG. 1. Moreover, in one embodiment, height adjustment mechanism 103 can be coupled to assembly mount component 105 via the tilt adjustment mechanism 107 as is shown in FIG. 1.

In one embodiment the height adjustment mechanism 103 can include a first nested slide plate 103A and a second nested slide plate 103B. In one embodiment, the first nested slide plate 103A can be coupled to the flat panel display 101 and the second nested slide plate 103B can be coupled to the assembly mount 105. It should be appreciated that, in one embodiment, assembly mount 105 stably positions the other components of the flat panel computer system assembly 100 on a user's work surface (e.g., desktop etc.).

In operation, when the flat panel display 101 and the coupled height adjustment mechanism 103 are prompted to move downward, a spring (see discussion made with reference to FIG. 2) that is included in the height adjustment mechanism 103 is caused to wind as a result of the downward movement of these components. It should be appreciated that the downward force of the weight of flat panel display 101 serves to supplement the user supplied force and assists in the downward positioning of the flat panel display 101 and thus the winding of the aforementioned spring.

Alternately, when the flat panel display 101 and coupled height adjustment mechanism 103 are moved upward, the spring that is included in the height adjustment mechanism 103 is caused to unwind as a result of the upward movement of these components. It should be appreciated that the upward force provided by the unwinding spring serves to supplement the user supplied upward force and assists in the upward positioning of the flat panel display 101.

Embodiments of the present invention, offer a compact slide approach to vertical height adjustment. The thin assemblage that is provided by exemplary embodiments can be useful as a component of either desktop or notebook systems that employ flat panel displays.

In one embodiment, the use of a gear (see discussion made below with reference to FIGS. 2A, 2B and 3) assists in keeping slidable components of the height adjustment mechanism coordinated. In one embodiment, the gear can drive the winding of the spring when users attempt to push the device downward and assist (by providing a supplemental upward force) users when they attempt to lift the device (e.g., the gear then assists in the spreading or the separating of the plates) upward.

In one embodiment, the strength of the spring can be selected based on the weight of the device which it is associated. In one embodiment, the strength of the spring is selected so that a relatively neutral force exerted by the spring enables a user to push the device down or to lift the device up for positioning in best use orientation for the user. In exemplary embodiments, this can be done with a minimal amount of effort. As previously discussed, in one embodiment, when the device is pushed down the weight of the device acts to help wind the spring. By contrast, when the device is lifted the spring unwinds and actually assists in the lifting of the device. As a consequence, the adjustment of the device involves an almost weightless adjustment force.

Embodiments of the present invention provide a thinner assembly than is provided by many conventional height adjustment assemblies. Moreover, according to one embodiment, because there is much less of a cantilever than is involved in conventional double pivot approaches, less physical structure can be employed. In one embodiment, because two pivot points may not be involved, friction washers may not be needed to prevent sag. Consequently, in such embodiments there may be less inertia to overcome when attempting to lift or push down components of an assembly.

Figure 2A:
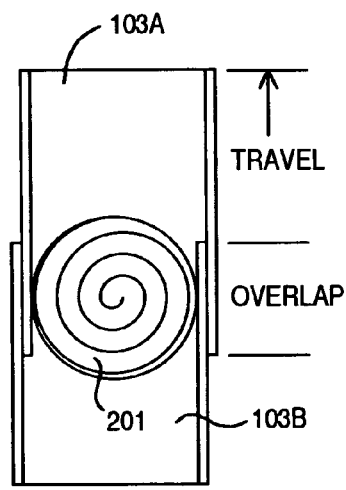
FIG. 2A illustrates the operation of height adjustment mechanism according to one embodiment of the present invention.
Figure 2B:
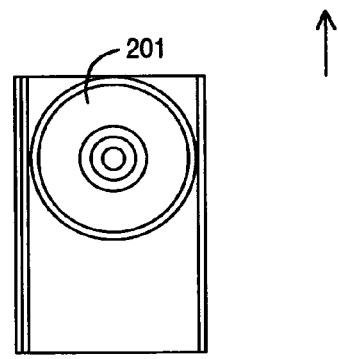
FIG. 2B illustrates the operation of height adjustment mechanism according to one embodiment of the present invention.

FIGS. 2A and 2B illustrate the operation of height adjustment mechanism 103 according to one embodiment of the present invention. FIG. 2A shows first nested slide plate 103A, second nested slide plate 103B and spring 201. In the FIG. 2A embodiment, nested slide plate 103A of height adjustment mechanism 103 can be moved vertically upward or downward.

In operation, when the first nested slide plate 103A of height adjustment mechanism 103 is moved downward from the position shown in FIG. 2A to the position shown in FIG. 2B the downward action will cause spring 201 to wind. The spring 201 when wound contains energy that can be used to assist in the upward positioning of first nested slide plate 103A. More specifically, when first nested slide plate 103A and a coupled panel display (e.g., 101 in FIG. 1) are prompted to move upward by a user supplied force, an upward force provided by the unwinding of spring 201 contributes to user supplied upward force and assists in the upward positioning of the flat panel display 101.

Alternately, when the first nested slide plate 103A of height adjustment mechanism 103 is moved downward from the position shown in FIG. 2A to the position shown in FIG. 2B the downward force of the weight of a coupled flat panel display (e.g., 101 in FIG. 1) can contribute to user supplied force. This downward force supplied by the weight of the coupled flat panel display can assist in the downward positioning of the first nested slide plate 103A (and thus the winding of the spring).

FIG. 3 illustrates basic components of the height adjustment mechanism according to one embodiment of the present invention. FIG. 3 shows first nested slide plate 103A and second nested slide plate 103B, spring gear 301, and pinion teeth 303.

In one embodiment, a spring gear 301 can be used to translate the upward or downward movement of first nested slide plate 103A into the winding or unwinding of spring 201. In one embodiment, the teeth of spring gear 301 and the pinion teeth 303 associated with first nested slide plate 103A mesh and facilitate the translation of upward and downward movement into the winding and unwinding of spring 201.

In one embodiment, by nesting the plates 103A and 103B and positioning the spring 201 and gear 301 within the plates, the thickness of the assembly may be minimized. Consequently, less torque is placed on tilt mechanism 107. Moreover, this minimization of torque may be realized across applications (e.g., desktop, notebook etc.).

In summary, embodiments of the present invention have been explicitly described that include a height adjustment mechanism for electronic equipment. The height adjustment mechanism includes a first sliding component that includes a first set of mechanical structures for engaging a second set of mechanical structures, a first mechanical sub-component coupled to the first sliding component and coupled to a second mechanical sub-component that includes the second set of mechanical structures and a second sliding component coupled to the first sliding component. The first set of mechanical structures and the second set of mechanical structures are configured to mesh. A movement of the first sliding component causes either an expansion or a retraction of the first mechanical sub-component. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A height adjustment mechanism, said mechanism comprising:
  a first sliding component that comprises a first set of mechanical structures for engaging a second set of mechanical structures;
  a first mechanical sub-component coupled to said first sliding component and integrated with a second mechanical sub-component that forms a peripheral portion of said first mechanical sub-component and comprises said second set of mechanical structures; and a second sliding component coupled to said first sliding component for sliding in a direction opposite to the sliding direction of said first sliding component, wherein said first mechanical sub-component and said second mechanical sub-component are located between said first sliding mechanism and said second sliding mechanism and said first set of mechanical structures and said second set of mechanical structures are configured to mesh wherein a movement of said first sliding component causes either an expansion or a retraction of said first mechanical sub-component through rotation of the second mechanical subcomponent;

wherein the first mechanical sub-component comprises a spring and the second mechanical sub-component comprises a gear.

2. The height adjustment mechanism of claim 1, wherein said height adjustment mechanism is for electronic equipment.

3. The height adjustment mechanism of claim 1, wherein said first sliding component is a nested slide plate.

4. The height adjustment mechanism of claim 1, wherein said second sliding component is a nested slide plate.

5. The height adjustment mechanism of claim 1, wherein said first set of mechanical structures are rack teeth.

6. The height adjustment mechanism of claim 1, wherein said second set of mechanical structures are gear teeth.

7. The height adjustment mechanism of claim 1, wherein said expansion of said first mechanical sub-component comprises an unwinding of said spring.

8. The height adjustment mechanism of claim 1, wherein said retraction of said first mechanical sub-component comprises a winding of said spring.

9. The height adjustment mechanism of claim 1, wherein a nesting of said first sliding component and said second sliding component with said spring and said gear positioned in-between serves to minimize torque.

10. A monitor assembly, comprising:
a monitor;
a base;
a tilt mechanism; and
a height adjustment coupled to said monitor and to said base via said tilt mechanism, wherein said height adjustment mechanism comprises:
a first sliding component that comprises a first set of mechanical structures for engaging a second set of mechanical structures;
a first mechanical sub-component coupled to said first sliding component and integrated with a second mechanical sub-component that forms a peripheral portion of said first mechanical sub-component and comprises said second set of mechanical structures; and
a second sliding component coupled to said first sliding component for sliding in a direction that is opposite to the sliding direction of said first sliding component, wherein said first set of mechanical structures and said second set of mechanical structures are configured to mesh wherein a movement of said first sliding component causes a winding or unwinding of said first mechanical sub-component;
wherein said first mechanical sub-component comprises a spring and said second mechanical sub-component comprises a gear.

11. The height adjustment apparatus mechanism of claim 10, wherein said height adjustment is for electronic equipment.

12. The height adjustment mechanism of claim 10, wherein said first sliding component is a nested slide plate.

13. The height adjustment mechanism of claim 10, wherein said second sliding component is a nested slide plate.

14. The height adjustment mechanism of claims 10, wherein said first set of mechanical structures are rack teeth.

15. The height adjustment mechanism of claim 10, wherein said second set of mechanical structures are gear teeth.

16. The height adjustment mechanism of claim 10, wherein said expansion of said first mechanical sub-component comprises an unwinding of said spring.

17. The height adjustment mechanism of claim 10, wherein said retraction of said first mechanical sub-component comprises a winding of said spring.

18. The height adjustment mechanism of claim 10, wherein said monitor comprises a flat panel display.

19. The height adjustment mechanism of claim 10, wherein a nesting of said first sliding component and said second sliding component with said spring and said gear positioned in-between minimized torque on said tilt mechanism.

20. A height adjustment mechanism for electronic equipment, said height adjustment mechanism comprising:
a first nested slide plate that comprises a first set of mechanical structures for engaging a second set of mechanical structures;
a first mechanical sub-component integrated with said first nested slide plate and coupled to a second mechanical sub-component that forms a peripheral portion of said first mechanical sub-component and comprises said second set of mechanical structures; and
a second nested slide plate component coupled to said first nested slide plate for sliding in a direction opposite to the sliding direction of said first nested slide plate, wherein said first mechanical sub-component and said second mechanical sub-component are located between a first sliding mechanism and a second sliding mechanism;
wherein said first set of mechanical structures and said second set of mechanical structures are configured to mesh wherein a movement of said first nested slide plate causes either an expansion or a retraction of said first mechanical sub-component;
wherein said first mechanical sub-component comprises a spring and said second mechanical sub-component comprises a gear.

21. The height adjustment mechanism of claim 20, wherein said first set of mechanical structures are rack teeth.

22. The height adjustment mechanism of claim 20, wherein said second set of mechanical structures are gear teeth.

23. The height adjustment mechanism of claim 20, wherein said expansion comprising an unwinding of said spring.

24. The height adjustment mechanism of claim 20, wherein said retraction comprises a winding of said spring.

25. The height adjustment of mechanism of claim 20, wherein said electronic equipment is a monitor comprising a flat panel display.

26. The height adjustment mechanism of claim 20, wherein a nesting of said first nested slide plate and said second nested slide plate with said spring and said gear positioned in-between served to minimized torque.

* * * * *